Oct. 6, 1931.  J. H. GONDER  1,825,725
APPARATUS FOR TESTING LUBRICATING OILS
Filed Nov. 2, 1928
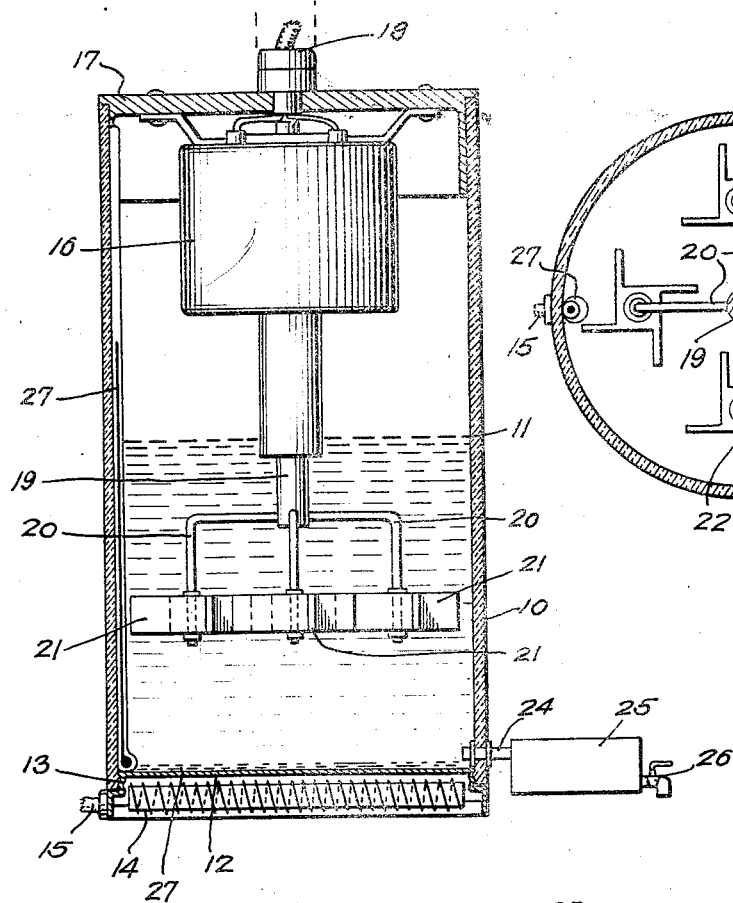
Fig.1.
Fig.2.
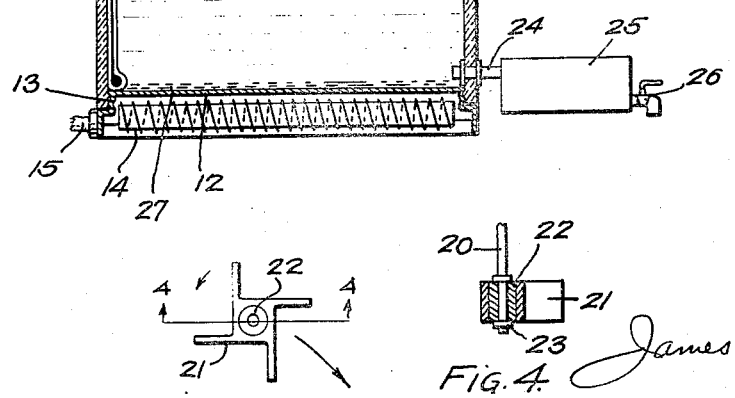
Fig.3.  Fig.4.
Inventor
James H. Gonder
By Edwin S. Clarkson
Attorney Patented Oct. 6, 1931 1,825,725

UNITED STATES PATENT OFFICE

JAMES H. GONDER, OF LIBERTY, MISSOURI

APPARATUS FOR TESTING LUBRICATING OILS

Application filed November 2, 1928. Serial No. 316,852.

The invention relates to an apparatus for testing oils, the object being to provide means for comparing the lubricating qualities of oils when subjected to tests approximating those met with under service conditions. According to my invention means are provided for heating oils to a desired temperature, for agitating the oils while at any desired temperature, and for roughly measuring the lubricating qualities of the oil while subjected to heat and agitation.

The invention will be more readily understood by reference to the accompanying drawings in which are shown an illustrative embodiment of the invention.

In the drawings,

Figure 1 is a vertical section through the oil testing device, the motor for driving the agitating veins being shown in elevation.

Figure 2 is a horizontal section of the same.

Figure 3 is a detail plan view showing one of the rotated veins, or paddles.

Figure 4 is a section on 4—4, Figure 3.

Referring to the drawings in detail, the reference numeral 10 denotes a container for oil to be tested, which container is preferably of glass so that the interior may be readily seen. Oil to be tested is placed in the container up to the level indicated by the reference numeral 11, and the container is provided with a removable bottom 12 which may be threaded into the body of the container as indicated at 13. Within the base member a suitable heating coil 14 may be located to which current may be supplied through lead 15 from any suitable source of supply, and the current may be regulated by any suitable means not shown so that the quantity of heat supply may be determined. The removable base is preferably of conducting material so that the heat may be transferred readily to the interior of the container.

For the purpose of agitating the oil a motor 16 is employed which may be secured to the removable top 7 of the container. This motor may be of any suitable type and is supplied with current through the lead 18. The motor drives a shaft 19 from which radiates a plurality of arms 20 which are bent downwardly as shown in Figure 1, and are provided with rotatable paddles, or veins, 21. Between each paddle wheel and the arm carrying it a bearing 22 of lead, or soft metal is employed. If desired the end of each arm 20 may be suitably roughed in order to prevent the bearing from rotating relative thereto. A nut 23, or suitable means is employed for holding the bearing in position upon the arm 21.

An offtake 24 leads from the lower portion of the container 10 through a chamber 25 to a faucet 26. The viscosity of the oil in the container may be tested by counting the number of drops per minute which will be eliminated from the faucet 26 when the latter is wide open.

For the purpose of measuring the temperature of the oil at any time a suitable thermometer 27 may be provided extending along the side of the glass container and visible from the exterior.

In operation the bottom 12 is screwed into the container and the latter filled with oil to the level 11. The top 17 carrying with it the motor 16 and the associated parts is then put into position as shown in full lines in Figure 1. Current is then supplied to the heating element 12 and to the motor 16. This results in heating of the oil to any desired temperature which may be determined by means of the thermometer and it may be regulated by a quantity of current supply. At the same time the motor operates the arms 20 carrying with them the paddle wheels 21. This results in a double rotation. First about the axis 19, and second the rotation of the paddle wheels 21 about the arms 20. The purpose of this rotation is two fold. First, to produce agitation of the oil and simulating the beating to which oil in an engine is subjected under service conditions. Secondly, the rotation of the paddle wheels 21 about the soft metal bearings produces a wear in these bearings. By reason of the fact that the bearings are soft metal the time of rotation is not nearly so long as in actual service conditions where hardened bearings are employed. This operation, however, furnishes a basis for comparison of various oils as to their standing up qualities and lubricating qualities.

After heating and agitating for a predetermined length of time, the viscosity of the oil may be tested by withdrawing the same through the faucet 26. It will also be found that there will be a deposit of sediment in the bottom of the container which is due to the wear of the soft metal bearings 22. The amount of this deposit may be determined in various ways, such as by allowing the oil to flow off above it and measuring its depth or by allowing all of the oil to flow off and weighing a predetermined quantity of the residuum. The difference between the specific gravity of the residuum and the original oil furnishes a basis for calculating the amount of sedimentary deposit. Thus the degree of wear on the bearings may be determined by the sedimentary deposit.

By employing a known oil as a standard other oils may be compared by the use of this device, the time and speed of agitation and the temperature of the oil being known in each case.

It will be understood that the bearings 22 are frictionally held in the paddle wheels 21 and that the wear occurs between the bearings 22 and the shaft 20.

Obviously, the invention is capable of many modifications which, however, are intended to be covered by the accompanying claims.

What I claim is:

1. An oil testing device comprising an oil container, a cover for said container, an electric motor suspended from said cover within the container, a motor shaft depending from the motor, a plurality of arms projecting radially from said shaft, vaned agitator members rotatably mounted on the ends of said arms and adapted to be rotated by a body of oil in the container when immersed therein, and moved thereagainst by rotation of the motor shaft, and bearing members interposed between the respective agitators and their arms and adapted to be abraded when the agitator members are rotated, whereby the agitator members serve both as a means for agitating a body of oil and for causing abrasion of said bearing members.

2. An oil testing device comprising a container having a transparent side wall and a heat transmitting bottom wall, a heating device supported by and acting on said bottom wall, a thermometer mounted in the container adjacent said transparent side wall, a power driven agitator including an arm mounted for swinging movement within the container, a vaned agitator member rotatably mounted on said arm and adapted to be rotated by a body of oil in the container when immersed therein and moved thereagainst by swinging movement of said arm, and a bearing member interposed between said agitator member and said arm and adapted to be abraded by rotation of the agitator member, whereby said agitator member serves both for agitating the body of oil and for causing abrasion of said bearing member.

3. An oil testing device comprising a container having a transparent side wall and a heat transmitting bottom wall, a heating device supported by and acting on said bottom wall, a thermometer mounted in the container adjacent said transparent side wall, a cover for the container, a motor suspended from said cover and including a depending motor shaft, a plurality of arms secured to and projecting radially from the motor shaft, a plurality of vaned agitator members rotatably mounted on said arms and adapted to be rotated by a body of oil in the container when immersed therein and moved thereagainst by rotation of the motor shaft, and a plurality of bearing members interposed between the respective agitator members and their arms, adapted to be abraded by rotation of the agitator members, whereby said agitator members serve both for agitating the body of oil and for causing abrasion of said bearing members.

4. An oil testing device comprising a container having a transparent side wall and a heat transmitting bottom wall, a heating device supported by and acting on said bottom wall, a thermometer mounted in the container adjacent said transparent side wall, a power driven agitator including an arm mounted for swinging movement within the container, a vaned agitator member rotatably mounted on said arm and adapted to be rotated by a body of oil in the container when immersed therein and moved thereagainst by swinging movement of said arm, and a bearing member interposed between said agitator member and said arm and adapted to be abraded by rotation of the agitator member, whereby said agitator member serves both for agitating the body of oil and for causing abrasion of said bearing member, and a petcock at the bottom of the container for drawing off the body of oil.

5. An oil testing device comprising an oil container, a power driven agitator including an arm positioned for swinging movement in the container, a vaned agitator member rotatably mounted on said arm and positioned to be immersed in a body of oil in the container and to be rotated by the oil when moved thereagainst by swinging movement of the arm, and a bearing member interposed between the arm and the agitator member and adapted to be abraded by rotation of the agitator member and adapted to be abraded by rotation of the agitator member relative to the arm, whereby the agitator member serves both as a means for agitating the body of oil and as a means for producing abrading action upon the bearing, and a pet-cock at the bottom of the container for drawing off the body of oil.

In testimony whereof, I affix my signature.

JAMES H. GONDER.